United States Patent [19]

Cessna, Jr.

[11] 3,882,073

[45] May 6, 1975

[54] THERMOSETTING COMPOSITIONS CONTAINING POLY(ARYLACETYLENES)

[75] Inventor: Lawrence C. Cessna, Jr., Wilmington, Del.

[73] Assignee: Hercules Incorporated, Wilmington, Del.

[22] Filed: Dec. 18, 1972

[21] Appl. No.: 316,332

[52] U.S. Cl.... 260/33.6 UA; 260/30.6 R; 260/30.8 R; 260/32.4; 260/32.8 R; 260/33.2 R; 260/42.29; 260/42.37; 260/42.43
[51] Int. Cl. ... C08f 45/28; C08f 45/44; C08f 45/48
[58] Field of Search............ 260/37 R, 88.2 D, 94.1, 260/93.5 R, 88.2 C, 33.6 UA

[56] References Cited
UNITED STATES PATENTS

| | | | |
|---|---|---|---|
| 3,066,119 | 11/1962 | Meriwether et al. | 260/94.1 |
| 3,300,456 | 1/1967 | Hay | 260/94.1 |
| 3,562,236 | 2/1971 | D'alelio | 260/33.6 UA |
| 3,705,131 | 12/1972 | Korshak et al. | 260/93.5 R |

FOREIGN PATENTS OR APPLICATIONS 971,170  9/1964  United Kingdom

*Primary Examiner*—Donald E. Czaja
*Assistant Examiner*—H. H. Fletcher
*Attorney, Agent, or Firm*—John W. Whitson

[57] ABSTRACT

The invention relates to thermosetting compositions which are blends of novel poly(arylacetylenes) and, as fluidizers, certain aromatic organic compounds containing at least two aromatic rings. The poly(arylacetylenes) are prepolymers of polyacetylenically substituted aromatic compounds, which prepolymers have a number average molecular weight of from about 900 to about 12,000 and contain from about 5 to 20% by weight of acetylenic groups. Diethynylbenzene is one of the preferred monomers used in preparation of the prepolymers. Representative of the compounds containing at least two aromatic rings are anthracene, phenanthrene and diphenylmethane. The compositions are curable by heat to produce thermoset resins which have very desirable physical properties at both normal and high temperatures.

15 Claims, No Drawings

THERMOSETTING COMPOSITIONS CONTAINING POLY(ARYLACETYLENES)

This invention relates to thermosetting compositions and thermoset resins therefrom, and more particularly to such compositions and resins derived from acetylenically substituted aromatic compounds. The thermoset resins have exceptional thermal stability, and the invention also relates to the preparation of these resins.

High temperature resins presently available have various drawbacks which limit their use in many applications. A serious one frequently encountered is the evolution of volatiles during the curing cycle, which makes it imperative that the entire curing cycle be carried out under pressure. For example, polyimides when cured release volatile components which cause gas bubble or void formation in the cured resin unless considerable pressure is maintained during the curing operation in order to prevent these undesirable results. When phenolic resins are cured, water is released which also causes void formation unless the curing reaction is carried out under pressure. Another disadvantage of the previously known high temperature resistant resins is their inability to be molded into desired shapes by conventional methods due to their poor flow characteristics.

Now, in accordance with this invention, thermosetting compositions have been discovered which have excellent melt flow properties and which can be molded or otherwise shaped without gas evolution, hence, after forming into the desired shape, they can be cured simply by heating, and this operation need not be carried out under pressure, since there also is no gas evolution during the curing step. In addition to being readily molded, the thermosetting compositions of this invention also are useful in other shaping or related operations, such as coating, casting, potting and impregnating operations. The thermosetting compositions of this invention comprise a blend of (1) a prepolymer of at least one polyacetylenically substituted aromatic compound, said prepolymer having a number average molecular weight of from about 900 to about 12,000 with (2) at least one aromatic organic compound containing at least two six-membered aromatic rings, which rings may be substituted by a methyl group. The aromatic rings may be condensed with each other or coupled with each other directly or through a single oxygen, sulfur, nitrogen or phosphorus atom or through a methylene, dimethylmethylene, ethylene, vinylene or keto group. These aromatic organic compounds or mixtures thereof are further characterized by containing no crystalline organic phase at 220°C., having a viscosity of less than 20 centipoises at 220°C. and containing no more than 5 % of material volatile at 240°C. when distilled according to the procedure of ASTM D20–56.

The thermoset resins obtained by curing the thermosetting compositions of this invention are characterized by being essentially free of aliphatic unsaturation and predominantly aromatic in structure. These thermoset resins are further characterized by having a flexural strength of at least about 4000 p.s.i. and a flexural modulus of at least about 350,000 p.s.i. Most of the resins also are characterized by retaining at least about 35% of said flexural modulus up to a temperature of at least about 300°C. in an inert atmosphere, retaining at least about 35% of said flexural strength and modulus and at least about 80% of their weight when a 30 mil thick sheet is aged in air at 260°C. for 220 hours and losing less than about 20% of their weight when heated, in powder form, to 500°C. at a rate of 10°C. per minute in an inert atmosphere.

The thermoset resins of this invention are prepared by a two stage process. There is prepared, in the first stage, a polyacetylenically unsaturated prepolymer from a polyacetylenically substituted aromatic compound. In the second stage, the prepolymer in combination with, as a fluidizer, at least one of the aromatic organic compounds containing at least two six-membered aromatic ring is fabricated and heated whereby resinification takes place. By this means it is possible to produce the thermoset resin in any desired shape since the blend of the prepolymer and the aromatic compound is readily formed into any desired shape and this molded, or otherwise formed, article can then be cured by heating and will retain its shape.

PREPARATION OF THE PREPOLYMER

As already stated, the first stage in the preparation of the thermoset resins of this invention is the formation of a prepolymer from at least one polyacetylenically substituted aromatic compound, which prepolymer is subsequently blended in a second stage with the fluidizing aromatic organic compound, and the resulting thermosetting composition then is fabricated and thermally cured.

The polyacetylenically substituted aromatic compound used to prepare these prepolymers can be any aromatic compound containing two or more acetylene groups, i.e., two carbons linked by a triple bond, attached to the same aromatic ring or to different aromatic rings in the compound, or mixtures of such compounds. The acetylenic groups can be internal, i.e., acetylene groups of the type aryl -C ≡ C-aryl, or they can be external, i.e., ethynyl groups of the type aryl-C ≡ C-H, or both types can be present in the polyacetylenic compound. Those compounds containing at least one external acetylenic group are preferred since these are the most reactive. Generally those compounds containing only internal acetylenic groups are used in admixture with a compound containing at least one ethynyl group. Exemplary of the polyacetylenically substituted aromatic compounds are m- and p-diethynylbenzenes; diethynyl toluenes; diethynyl xylenes; 9,10-diethynylanthracene; diethynylbiphenyl; 9,10-diethynylphenanthrene; 4,4'-diethynyl-trans-azobenzene; di(ethynylphenyl)ether; 2,3,5,6-tetrachloro-1,4-diethynylbenzene; diphenyldiacetylene (i.e., diphenylbutadiyne); dibenzyldiacetylene; di-p-tolyldiacetylene; di-α-naphthyldiacetylene; 1-chloro-2,5-diethynylbenzene; 2,2'-dichlorodiphenyldiacetylene; 4,4'-dichlorodiphenyldiacetylene; 4,4'-dibromodiphenyldiacetylene; 1,4-bis(phenylethynyl)benzene; 1,3-bis(phenylethynyl)benzene; 9,10-bis(phenylethynyl)anthracene; 1,3,5-triethynylbenzene; 1,2,4-triethynylbenzene; 1,3,5-tris(phenylethynyl)-2,4,6-triphenylbenzene; 1,2,4-tris(phenylethynyl)-3,5,6-triphenylbenzene; tris(ethynylphenyl)benzene, etc. Monoacetylenically substituted aromatic compounds can also be utilized in the preparation of the prepolymer as, for example, phenylacetylene, biphenylacetylene and diphenylacetylene.

As mentioned earlier, mixtures of the polyacetylenically substituted aromatic compounds may be used to prepare the prepolymers. A particularly advantageous mixture is that of diethynylbenzene with diphenylbutadiyne, with the latter component constituting from about 30 to about 75% by weight of the total mixture. The diethynylbenzene component may be m-diethynylbenzene, p-diethynylbenzene or mixtures thereof. The resulting copolymers contain about 30% to about 75 % by weight of diphenylbutadiyne-derived units since the diphenylbutadiyne component enters the copolymer at substantially the same rate as the diethynylbenzene component. These copolymers may be cured, after blending with at least one of the aromatic fluidizers of this invention, to provide thermoset resins having the prescribed strength and high temperature oxidation resistance properties. In addition, the resins derived from these copolymers have significantly higher elongation at break values, about 1.1 to about 1.8%, in comparison to the corresponding resins derived from diethynylbenzene homopolymers, wherein the elongation at break values are less than 1.0%.

Another advantageous mixture is that of diethynynlbenzene with phenylacetylene. Again, the diethynylbenzene component may be m-diethynylbenzene, p-diethynylbenzene or mixtures thereof. The phenylacetylene component in this case enters the copolymer at approximately one-half the rate of the diethynylbenzene component. Thus, considerable variation in the composition of the reaction mixture is possible in producing copolymers containing from about 10 to about 45% by weight of phenylacetylene-derived units. The resulting copolymers when combined with at least one of the aromatic fluidizers of this invention can be cured to provide thermoset resins having the prescribed high temperature oxidation resistance properties. Additionally, these resins are significantly higher in flexural strength and flexural modulus in comparison to the corresponding resins prepared from the diethynylbenzene homopolymers.

The prepolymerization reaction is carried out by heating the polyacetylenically substituted aromatic compound with an aromatization catalyst. The reaction can be carried out in bulk or in the presence of an inert diluent. Any inert diluent can be used, as, for example, ethers such as 1,2-dimethoxyethane, dioxane and tetrahydrofuran, ketones, such as acetone, or aromatic hydrocarbons such as benzene, toluene, xylene, etc. The amount of diluent used is not critical and generally will be such as to form a concentration of the polyacetylenically substituted aromatic compound in the diluent of from 2 to 50%. Obviously, larger amounts can be used.

Any aromatization catalyst can be used to effect the desired cyclization reaction. By the term aromatization catalyst is meant a catalyst that promotes the formation of an aromatic ring by the cyclization of three acetylene groups. Preferred aromatization catalysts are nickel catalysts such as nickel bis(acrylonitrile), nickel bis(acraldehyde), nickel carbonyl bis(triphenylphosphine), nickel cyanide bis(triphenylphosphine), nickel acetylacetonate in combination with triphenylphosphine, and the Group V-B metal halides such as niobium pentahalides and tantalum pentahalides. The amount of the catalyst used can be varied widely but generally will be from about 0.5 to about 5% of the monomer by weight.

The polymerization is carried out by heating the polyacetylenic monomer, or mixtures of monomers, with the catalyst to a temperature of from about 55°C. to about 250°C. and more preferably from about 80°C. to about 150°C. Preferably the reaction is carried out in an inert atmosphere.

In carrying out the process it is essential to stop the reaction prior to complete conversion of the monomer. If the reaction is allowed to go to completion, the product is a highly cross-linked, insoluble, infusible material that cannot be plastic formed, nor can it be fluidized with one of the fluidizers of this invention and then plastic formed. Hence the reaction is generally stopped at a monomer conversion above about 30 % and below about 90%, and preferably at a monomer conversion of from about 50% to about 90%. By so doing, it is possible to produce a prepolymer having a number average molecular weight of from about 900 to about 12,000, avoid the production of the very high molecular weight polymer that is cross-linked and no longer useful for the production of plastic formed articles and at the same time retain in the prepolymer at least about 5%, and preferably about 5 to 20%, acetylene groups by weight of the prepolymer for reaction in the second stage of the thermoset resin preparation. The prepolymers are soluble in aromatic hydrocarbons, ketones and ethers.

The method by which the prepolymerization reaction is stopped and the prepolymer is isolated will, of course, depend in large measure on the method used in preparing the prepolymer, the monomer or monomers used in its preparation, etc. If a polyacetylenically substituted aromatic monomer of high volatility were used in the preparation of the polymer, i.e., one having a boiling point below about 250°C., then any of such a monomer remaining in the prepolymer should be removed to avoid foaming and void formation in the plastic forming and curing steps used in the preparation of the thermoset resin in the second stage reaction. This removal can be effected by vacuum evaporation or steam distillation of the prepolymerization reaction mixture or the reaction mixture can be mixed with a diluent which is a solvent for the monomer and a nonsolvent for the prepolymer. In the latter case, the prepolymer can be separated, as for example, by filtration, and the monomer, any prepolymer remaining in solution, and the diluents can be recovered and recycled in the process. Suitable diluents for precipitating the prepolymer are methanol, ethanol and isopropanol, and aliphatic hydrocarbons or mixtures thereof such as petroleum ether, pentane, hexane, heptane, etc.

The prepolymers of this invention are unique polymers, and are described and claimed in the copending application of Harold Jabloner, Ser. No. 262,166, filed June 12, 1972. In contrast to the acetylene polymers of the prior art, the instant polymers can be used to prepare thermoset resins having the desirable properties described herein. It is well known that acetylene and substituted acetylenes, as for example phenylacetylene, can be polymerized, but the polymers so produced are linear polymers, many of which have olefinic or actylenic unsaturation in the polymer chain. It is also known that aliphatic compounds containing two or mre acetylenic groups can be polymerized, but again the polymer is linear and contains acetylenic unsaturation in the polymer chain. However, the instant prepolymers, prepared from a polyacetylene compound with an aromatization catalyst, differ from the prior art acetylene polymers in that they are predominately non-linear in structure, at least 50% of the acetylenic unsaturation of the monomer having been converted during polymerization into aromatic structures. Furthermore, the unsaturation remaining in the prepolymer is chiefly acetylenic, which permits further polymerization in the second stage reaction, and the prepolymer has only a low degree of olefinic unsaturation. The acetylenic content of the prepolymer will preferably be from about 5% to about 20% by weight of the prepolymer. the low degree of olefinic unsaturation is important since the presence of a significant amount of such unsaturation leads to thermal and oxidative instability of the final thermoset resin at high temperature. The formation of aromatic structures during the polymerization contributes oxidation resistant and stable linkages.

The olefinic unsaturation of the prepolymer can be determined by a nuclear magnetic resonance method in which the number of hydrogen atoms attached to olefinic carbons, such hydrogens hereafter being referred to as olefinic protons, is compared with the number of hydrogen atoms attached to aromatic rings, such hydrogens hereafter being referred to as aromatic protons. The amount of acetylenic unsaturation can be determined by a similar technique comparing the ratio of hydrogens attached to acetylenic carbons, such hydrogens hereafter being referred to as acetylenic protons, with the aromatic protons. The prepolymer, to be useful in the preparation of the final thermoset resin, will, as stated above, have a ratio of aromatic protons to olefinic protons greater than about 2.4:1 and preferably greater than about 7.5:1.

The ratio of actylenic, aromatic and olefinic protons present in the prepolymer is determined by a nuclear magnetic resonance method using deuterated acetone as a solvent. The areas under the peaks near 3.63 ppm., the peak at 7.48 ppm., and under the curve between 6.83 and 5.4 ppm. are proportional to the number of actylenic, aromatic and olefinic protons, chemical shift values being measured versus an internal tetramethylsilane reference.

The amount of acetylenic protons, and so the acetylene group concentration, is determined quantitatively by use of an internal standard, nitromethane added in accurate proportion to the prepolymer and giving a signal peak at 4.42 ppm.

PREPARATION OF THE THERMOSETTING COMPOSITION

The above-described prepolymers are high melting materials and, in so far as most thermoforming techniques are concerned, the prepolymers do not have the flow properties required for plastic forming at temperatures below the aromatization polymerization reaction temperature. In other words, if they are heated to flow temperature the polymerization reaction proceeds so that an infusible, insoluble and intractable product is formed. In accordance with this invention, it has been found that by adding at least one of the aromatic fluidizer compounds of this invention, it is possible to produce a composition that will have sufficient flow to permit plastic forming and that, when further heated after plastic forming, will cross-link through the acetylenic unsaturation in the prepolymer to produce a thermoset resin.

The aromatic fluidizers that can be used to modify the flow properties of the prepolymer, yet not detract from the desired high temperature stability and oxidation resistance properties of the thermoset resin products, can be any aromatic organic compound having the specified structure and physical characteristics. The compounds or mixtures thereof should contain no more than 5 % of material volatile at 240°C. when distilled according to the procedure of ASTM D20-56, to avoid undue loss by vaporization during fabrication and thermal curing. Also, the compounds or mixtures of compounds should contain no crystalline organic phase at 220°C. to insure compatability with, and consequent fluidization of, the prepolymer. The temperature at which the compounds or mixtures thereof contain no crystalline organic phase is of further significance in that this temperature should not be so high as to cause an excessive amount of curing of the prepolymer during the time required to effect fabrication of the thermosetting composition containing it. The fluidizer compounds also should have a viscosity of less than 20 centipoises at 220°C. and should be thermally stable and resistant to oxidation at high temperatures. Compounds having these properties are further characterized by containing at least two six-membered aromatic rings, which rings may be substituted by a methyl group, the rings being condensed with each other or coupled with each other directly or through a single oxygen, sulfur, nitrogen or phosphorus atom or through a methylene, dimethylmethylene, ethylene, vinylene or keto group.

More specifically, the fluidizer compounds of this invention are aromatic compounds containing two or more benzene or pyridine rings condensed with each other or coupled to each other directly or through specified atoms or groups acting to link the rings to each other. Exemplary of the condensed ring aromatics are anthracene, 1-methylanthracene, 2-methylanthracene, 1-methylnaphthalene, 2-methylnaphthalene, 1,4-dimethylnaphthalene, 2,3-dimethylnaphthalene, 2,6-dimethylnaphthalene, phenanthrene, 1-methylphenanthrene, 3-methylphenanthrene, pyrene, 3,4-benzypyrene, fluoranthene, triphenylene, 1-phenylnaphthalene, 2-phenylnaphthalene, acenaphthene, quinoline, isoquinoline, acridine, phenanthridine, phenazine, 2,3-diphenylquinoline, 2,4-diphenylquinoline and 2,2'-diquinolyl. All of these compounds have a boiling point greater than about 240°C., which corresponds to a vapor pressure of less than about 10 mm. at 100°C., and a melting point less than about 220°C.

Some of the above compounds, for example, the phenylnaphthalenes, the diphenylquinolines and 2,2'-diquinolyl, are also illustrative of those compounds wherein the aromatic rings are coupled directly to each other. Additional representative compounds of this type are diphenyl, 2,2'-dimethyldiphenyl, 3,3'-dimethyldiphenyl, 4,4'-dimethyldiphenyl, 1,1'-dinaphthyl, 2,2'-dinaphthyl, 1,2-diphenylbenzene, 1,3-diphenylbenzene, 1,4-diphenylbenzene, 1,2,3-triphenylbenzene, 1,3,5-triphenylbenzene, 2,2'-dipyridyl, 2,3'-dipyridyl, 2,4'-dipyridyl, 3,3'-dipyridyl, 3,4'dipyridyl, 4,4'-dipyridyl, 2,4-diphenylpyridine, 2,6-diphenylpyridine, 2,3,6-triphenylpyridine, 2,4,5-triphenylpyridine and 2,4,6-triphenylpyridine. These compounds also all boil at a temperature greater than about 240°C. and melt at a temperature less than about 220°C.

Finally, there are those fluidizer compounds wherein the aromatic rings are coupled to each other through a single oxygen, sulfur, nitrogen or phosphorus atom or through a methylene, dimethylmethylene, ethylene, vinylene or keto group. Compounds of this type are exemplified by diphenyl ether, diphenyl sulfide, diphenyl sulfone, triphenylamine, triphenylphosphine, triphenylphosphine oxide, diphenylmethane, 2,2-diphenylpropane, 1,2-diphenylethane, stilbene and benzophenone. Also included are compounds, such as diphenylene oxide, diphenylene sulfide, fluorene and fluorenone, in which, in addition to the linking atom or group, the rings are directly coupled to each other elsewhere in the molecule. Also to be noted again is acenaphthene, in which the aromatic rings not only are condensed with each other but also are coupled to each other through an ethylene group. Again, all of these compounds are characterized by having boiling points greater than about 240°C. and melting points less than about 220°C.

The fluidizer compounds of this invention may be used either individually or in admixture with each other. Other materials may be present in small amounts, if they do not detract from the desirable characteristics of the fluidizing compounds and if the mixture meets the specified melting, viscosity and volatility requirements. For example, small amounts of volatile materials can be tolerated in mixtures with higher boiling materials without causing void formatin in the compositions during cure. Also, materials melting above 220°C. can be tolerated in admixture with other compounds which will depress the melting point of the mixture to below 220°C. Representative of such higher melting compounds useful in mxtures with other compounds are chrysene, perylene, coronene, benzperylenes, picene, benzfluorenes, benzofluoranthenes and carbazole. Particularly advantageous for use as fluidizing agents are the complex mixtures of high boiling aromatic compounds present in high boiling fractions of coal tar and petroleum pitches.

Moreover, the fluidizer compounds of this invention may be used in admixture with the acetylenic fluidizers disclosed and claimed in the aforementioned copending application of Harold Jabloner. Representative of such acetylenic fluidizers are beta-naphthylacetylene, biphenylacetylene, 4-ethynyl-transazobenzene, diphenylacetylene, di-m-tolylacetylene, di-o-tolylacetylene, bis(4-ethylphenyl)acetylene, bis(3,4-dimethylphenyl)acetylene, bis(4-chlorophenyl)acetylene, phenyl benzoyl acetylene, beta-naphthylphenylacetylene, di(alphanaphthyl)acetylene, 1,4-diethynylnaphthalene, 9,10-diethynylanthracene, 4,4'-diethynylbiphenyl, 9,10-diethynylphenanthrene, 4,4'-diethynyl-transazobenzene, 4,4'-diethynyldiphenyl ether, 2,3,5,6-tetrachloro-1,4-diethynylbenzene, diphenylbutadiyne, di-p-tolyl-diacetylene, dibenzyldiacetylene, 2,2'-dichlorodiphenyl diacetylene, 3,3'-dichlorodiphenyl diacetylene, di(alpha-naphthyl) diacetylene, diethynyldiphenyl butadiyne, etc.

Just how the aromatic fluidizer compound acts on the prepolymers to produce a plastic formable composition is not known. It is believed that it acts as a plasticizer, making it possible to shape the high melting prepolymer, but that it also may undergo partial reaction with the prepolymer during the curing step. In any event, such aromatic fluidizers, unlike ordinary plasticizers, are resistant to loss from the cured resin at high temperatures and do not detract from the excellent oxidation resistance of the resin.

The amount of the aromatic fluidizer incorporated in the prepolymer can be varied over a wide range, but generally will be from about 2% to about 200% by weight of the prepolymer, preferably from about 10% to about 100%, and more preferably from about 20% to about 50% by weight based on the prepolymer. When used in conjunction with an acetylenic fluidizer, the amount of aromatic fluidizer will generally constitute from about 25 to about 75% of the total amount of fluidizer. The aromatic fluidizer can be incorporated in the prepolymer in a variety of ways. One of the simplest methods is to mix the two in a diluent that is a solvent for the two and which is preferably low boiling for ease in removing the diluent after the mixing operation. Suitable diluents for this purpose are methylene chloride, dichloroethane, acetone, methyl ethyl ketone, benzene, toluene, etc. Such diluents can be removed, after adequate mixing has been achieved, by evaporation, distillation, etc. The mixing operation can be carried out at any convenient temperature, generally at room temperature. On the other hand, if the monomer or monomers used for the preparation of the prepolymer have boiling points above about 240°C., the unreacted portion does not need to be removed from the prepolymer and can act as part of the fluidizer in the thermosetting composition.

There can also be incorporated in the thermosetting composition fillers, pigments, antioxidants and other desired additives. Such additives are readily incorporated at the time the prepolymer and the aromatic fluidizer are mixed and while the mixing diluent is still present. Exemplary of the materials that can be incorporated are organic and inorganic fibrous materials such as graphite, glass, asbestos, metals, metal oxides, metal carbides, boron, boron carbide, silicon carbide fibers, and particulate reinforcements such as glass beads, metal oxides, metal carbonates, clay, diatomaceous earth, etc. The amount of the filler incorporated in the thermosetting composition can be varied widely, but generally will be from about 1 to about 95 percent by weight of the composition.

After removing the mixing diluent, the plastic composition so obtained can be divided by any desired means into suitable size pieces for subsequent fabrication operations. Alternatively, the composition can be ground to a fine powder and converted into pellets convenient for utilization in subsequent operations by compacting under pressure at room temperature or at a somewhat elevated temperature. These thermosetting compositions are stable and can be stored at room temperature.

FORMATION OF THE THERMOSET RESIN

The prepolymer modified with the aromatic fluidizer will melt on heating and remain sufficiently fluid so that the composition can be shaped by conventional plastic forming such as extrusion, compression, transfer and injection molding, calendering, forging, etc. Thus, shapes such as sheets, pipes, rods and wire coatings can be made by extrusion. Sheets can in subsequent operations be further modified in form as by embossing or thermoforming. More complex shapes can be made by molding operations. The temperature employed in plastic forming and related operations can be varied widely, the preferred temperature being dependent on the amount of the aromatic fluidizer employed, the molecular weight of the prepolymer, the type and amount of any filler or reinforcing agent present, the fabrication method, the pressure employed, and the amount of cross-linking desired during the fabrication operation. Temperatures as low as about 40°C. can be used, or as high as 200°C., but generally will be within the range of from about 90°C. to about 165°C. As the heating continues above about 90°C., and generally at a pressure of from about 15 to about 15,000 p.s.i., the thermosetting composition resolidifies. In operations such as extrusion or injection molding in which it may be desirable to recycle scrap material, low temperatures are employed to avoid much change in the flow properties of the composition during the fabrication. In other operations such as transfer or compression molding, it may be desirable to fabricate the material at an elevated temperature so that cross-linking or curing of the material occurs during the shaping operation.

After the fabrication operation and heating above 90°C. for a sufficient time to solidify the material, continued application of pressure during subsequent curing is not necessary. The further polymerization or cross-linking reaction to form the insoluble, thermally stable resin does not involve formation of any gaseous or volatile materials and accordingly there is no foaming or void formation. The fabricated article can then be converted to a thermoset resin by additional heating.

The temperature at which the thermosetting composition is heated to effect the further polymerization and cross-linking, which can be referred to as the curing operation, can be varied widely and will depend on such factors as the components of the thermosetting composition, the size and shape of the fabricated article, etc. In general, the conditions for effecting the cure will range from several hours at a temperature of about 100°C. to a few minutes at a temperature of about 300°C. Alternatively, a fabricated article can be used in its only partially cured form, and curing can be effected during use at an elevated temperature.

The reaction that takes place during the curing of the thermosetting composition containing both an aromatic fluidizer and an acetylenic fluidizer involves copolymerization between the prepolymer and the acetylenic fluidizer, which reaction at the same time effects cross-linking of the prepolymer. Hence, in this case, the final thermoset resin can be defined as a copolymer of the prepolymer and the acetylenic fluidizer. In the case of a molding composition containing only an aromatic fluidizer, the reaction during curing primarily is one of further polymerization of the prepolymer, with perhaps some accompanying reaction of the prepolymer with the aromatic fluidizer.

The thermoset resins so produced are hard, stiff, strong, abrasion resistant, infusible and insoluble. They retain strength, stiffness and insolubility at elevated temperatures, are stable to exposure at elevated temperatures for extended periods, and are resistant to oxidative attack at elevated temperature. Their oxidative stability can be further enhanced by incorporation of stabilizers such as ammonium biphosphate, calcium hypophosphite and butyl acid phosphate. They are highly resistant to chemical attack by strong acids and concentrated alkali. As previously stated, these thermoset resins are characterized by having a flexural strength of at least about 4000 p.s.i. and a flexural modulus of at least about 350,000 p.s.i. Most of the resins also are characterized by retaining at least about 35% of said flexural modulus in an inert atmosphere up to a temperature of at least about 300°C., retaining at least about 35% of said flexural strength and modulus and at least about 80% of their weight when a 30 mil thick sheet is aged in air at 260°C. for 220 hours and losing less than about 20% of their weight when heated, in powder form, to 500°C. at a rate of 10°C. per minute in an inert atmosphere. Obviously, these values can be greatly improved by the addition of fillers and other strengthening additives.

By the terms "flexural strength" and "flexural modulus" is meant the strength and modulus as measured according to the procedure described in ASTM No. D-790-70 — Flexural Properties of Plastics.

The new thermosetting compositions of this invention are useful as thermosetting binder resins for glass, carbon, asbestos and boron fibers and in the preparation of moldings to be used in high temperature environments, as for example, turbine blades for jet engines, aeroplane wing edges, ablative coatings for space reentry vehicles, bearings, grinding wheels, brake linings and clutch facings. The compositions also are useful as chemically resistant coatings.

The following examples will illustrate the preparation of the prepolymers, the thermosetting compositions and the thermoset resins of this invention. All parts and percentages are by weight unless otherwise indicated.

EXAMPLE 1

A polymerization vessel was charged with a mixture of 630 parts of meta-diethynylbenzene and 70 parts of paradiethynylbenzene dissolved in 3077 parts of anhydrous benzene. The solution was sparged with nitrogen and heated to reflux temperature. There then was added to the refluxing solution in four approximately equal increments a catalyst mixture prepared by mixing 4.4 parts of nickel acetylacetonate and 8.8 parts of triphenylphosphine in 50 parts of anhydrous benzene. After addition of the initial increment, the others were separately added one, two and three hours later. The solution was held at reflux temperature for a total of six and one-quarter hours, at which time the monomer conversion was 85.5%. The prepolymer then was precipitated by adding the solution to seven times its volume of petroleum ether and the yellow powder, separated by filtration, amounted to 406 parts. The prepolymer contained 11.8% acetylene groups.

EXAMPLE 2

Molding compositions were prepared by dissolving the prepolymer of Example 1 and the fluidizers of Table I in acetone, with thorough mixing, then removing the acetone solvent in a rotary evacuator. The compositions were dried under vacuum for 16 hours at room temperature, followed by one hour at 60°C. Using parallel plate plastometry and a temperature scan rate of 10°C. per minute, the viscosity of these molding compositions at various temperatures was determined. The data so obtained are given in Table I. These data demonstrate the fluidizing action of the aromatic fluidizers listed in the table.

TABLE I

| Fluidizer | Weight % (based on prepolymer) | Viscosity ($\times 10^5$ poise) | | | |
|---|---|---|---|---|---|
| | | 80°C. | 90°C. | 100°C. | 110°C. |
| None | 0 | >1000 | ca. 1000 | 50 | 13 |
| Anthracene | 18 | ca. 300 | 40 | 5 | 2.5 |

TABLE I—Continued

| Fluidizer | Weight % | Viscosity (× 10$^5$ poise) | | | |
|---|---|---|---|---|---|
| | 43 | >1000 | 200 | 30 | 8.5 |
| | 100 | 700 | 90 | 15 | 7.5 |
| Phenanthrene | 18 | 9 | 6 | 8 | 7 |
| | 43 | 3 | 1.5 | .3 | .04 |
| | 100 | .02 | .001 | .0005 | .0003 |
| Anthracene + Diphenylbutadiyne | 12 12 | 60 | 10 | 6 | 3 |
| Phenanthrene + Diphenylbutadiyne | 12 12 | 4 | 3 | 1.2 | .3 |
| Diphenyl Ether | 2 | — | 150 | 20 | 7 |
| | 5 | — | 40 | 7 | 4 |
| | 18 | 4 | 1.8 | 1 | 1 |
| Diphenyl Sulfide | 2 | 500 | 100 | 60 | 30 |
| | 5 | 150 | 80 | 30 | 10 |
| | 18 | 4 | 1.5 | .9 | 1 |

EXAMPLE 3

Representative molding compositions from those prepared in Example 2 were molded and cured and the cured specimens were evaluated as to mechanical properties. The mold used was a fully positive disk mold having an internal diameter of one inch. The mold was charged at room temperature with a sample of the molding composition and heated to 80°C. Pressure then was applied to consolidate the molding composition and heating was continued until a temperature of 170°C. was reached. The molded disk, 20 mils in thickness, was then removed from the mold and post-cured at 250°C. and atmospheric pressure for four hours.

The flexural strength and flexural modulus of the cured compositions were determined by measurement of the forces required to cause deflection and ultimate failure of the test specimens when these forces are applied at the unsupported centers of the specimens. The data obtained, as well as the molding pressures used in preparation of the disk specimens, are given in Table II.

TABLE II

| Fluidizer | Weight % | Molding Pressure | Flexural Strength | Flexural Modulus |
|---|---|---|---|---|
| | (based on prepolymer) | (p.s.i.) | (p.s.i.) | (p.s.i.) |
| None | 0 | >3,000 | 9,000 | 1,050,000 |
| Anthracene | 18 | <3,000 | 6,700 | 970,000 |
| | 43 | <3,000 | 7,400 | 1,020,000 |
| | 100 | >3,000 | 4,000 | 350,000 |
| Phenanthrene + silica* | 43 | <3,000 | 6,300 | 1,160,000 |
| Anthracene + Diphenylbutadiyne | 12 12 | <3,000 | 14,200 | 1,450,000 |
| Phenanthrene + Diphenylbutadiyne | 12 12 | < 100 | 9,160 | 980,000 |
| Diphenyl Sulfide + silica* | 18 | >3,000 | 9,140 | 1,800,000 |

*Calcined diatomaceous earth (93–95% SiO$_2$) present in an amount equal in weight to the combined weight of the prepolymer and fluidizer.

EXAMPLE 4

Disk specimens prepared according to the procedure of Example 3 were evaluated for functional oxidative stability. The disks were weighed, placed in a circulating air oven and aged at 260°C. After 220 hours, the disks again were weighed, with the following results:

| Fluidizer | Weight % | Weight Loss |
|---|---|---|
| | (based on prepolymer) | % |
| None | 0 | 10 |
| Anthracene | 18 | 2.6 |
| | 43 | 3.2 |
| | 100 | 12.2 |
| Phenanthrene | 43 | 15 |
| Diphenyl Sulfide | 18 | 19 |

EXAMPLE 5

Other disk specimens prepared according to the procedure of Example 3 were ground to fine powders (passing 100 mesh screen) and were evaluated for pure thermal stability. This involved testing the samples for weight loss by thermogravimetric analysis by heating in a nitrogen atmosphere to 500°C. at a rate of 10°C. per minute. The following results were obtained:

| Fluidizer | Weight % | Weight Loss |
|---|---|---|
| | (based on prepolymer) | % |
| None | 0 | 7 |
| Anthracene | 43 | 14 |
| Phenanthrene | 43 | 18 |

EXAMPLE 6

The polymerization of Example 1 was substantially duplicated except to use a catalyst mixture containing 4.7 parts of nickel acetylacetonate and 9.3 parts of triphenylphosphine. This polymerization then was repeated four times using double the amounts of all reaction mixture components, and also was once repeated using nearly three times the amounts of all components. Total monomer charged in this last reaction was 2,000 parts. Monomer conversion in these reactions was in the range of 87–89%. The six reaction mixtures then were added to approximately six times their total volume of heptane. The precipitated prepolymer was recovered by filtration and amounted to 3,652 parts.

EXAMPLE 7

Following the procedures of Examples 2 and 3, additional aromatic fluidizers were evaluated using the prepolymer of Example 6. The data obtained are given in Tables III and IV.

TABLE III

| Fluidizer | Weight % (based on prepolymer) | Viscosity (× 10⁵ poise) | | | |
|---|---|---|---|---|---|
| | | 80°C. | 90°C. | 100°C. | 110°C. |
| None | 0 | — | 1000 | 500 | 100 |
| Diphenylmethane | 25 | 4.5 | 5 | 2.5 | .5 |
| Benzophenone | 25 | 5 | 3.2 | 3 | .6 |
| cis-Stilbene | 25 | 5.2 | 4.2 | 4.5 | 2 |

TABLE IV

| Fluidizer | Weight % (based on prepolymer) | Molding Pressure (p.s.i.) | Flexural Strength (p.s.i.) | Flexural Modulus (p.s.i.) |
|---|---|---|---|---|
| None | 0 | >3,000 | 9,800 | 1,200,000 |
| Diphenylmethane | 25 | <3,000 | 18,000 | 1,800,000 |
| Benzophenone | 25 | <3,000 | 15,000 | 2,100,000 |
| cis-Stilbene | 25 | <3,000 | 15,000 | 1,600,000 |

EXAMPLE 8

The fluidizers of Example 7, at the levels indicated, also were evaluated with the prepolymer of Example 6 in the ageing tests described in Examples 4 and 5. The data obtained are as follows:

| Fluidizer | % Weight Loss (in air, 220 hrs., 260°C.) | % Weight Loss (in nitrogen, 500°C.) |
|---|---|---|
| None | 8 | <10 |
| Diphenylmethane | 7.2 | 10 |
| Benzophenone | 12 | 8 |
| cis-Stilbene | 12 | 6 |

EXAMPLE 9

A polymerization vessel with a nitrogen atmosphere was charged with 71 parts of p-diethynylbenzene, 1.062 part of nickel acetylacetonate, 2.124 parts of triphenylphosphine and 737 parts of anhydrous dioxane. The clear pale-green solution was then heated, while stirring, to reflux temperature and held there until the desired conversion level of 57% was achieved. This was determined by withdrawing an aliquot periodically, cooling the aliquot to room temperature, pouring it into 5 volumes of petroleum ether, drying and weighing the precipitate. When the desired conversion was reached (1 hour, 50 minutes), the reaction mixture was poured into 5 volumes of petroleum ether. A dark, tarry mass precipitated. The supernatant was separated and filtered. The solids were allowed to air dry and then were washed with petroleum ether and dried. The product so obtained was a brown powder. It had a number average molecular weight of about 2900. Analysis by NMR as described above showed the prepolymer to have a ratio of aromatic protons to olefinic protons of greater than 30:1. The prepolymer contained 15.0% acetylene groups.

A molding composition was prepared by mixing 50 parts of a calcined diatomaceous earth containing 93–95% $SiO_2$, which had previously been dried by heating to 300°C. and cooling under anhydrous conditions, 8.5 parts of 1-phenylnaphthalene, and 41.5 parts of the above prepared prepolymer, adding enough acetone to dissolve the two organic materials and to obtain better mixing with the filler. The acetone was then evaporated in an air stream and then under vacuum. The molding composition so obtained with a fine cocoa-brown powder.

The mold used for molding this composition was a semipositive 2¼ inch disk mold. Into the mold at room temperature was placed an aluminum disk, 5.3 g. of the molding composition, and a second aluminum disk. The male part of the mold was inserted and the mold was placed in a preheated hydraulic press, the temperature of the molding sample being monitored by means of a thermocouple. The temperature of the sample was increased to 275°C. during 50 minutes heating under a pressure of 1500 p.s.i. The heaters were turned off (final temperature of sample 280°C.), the pressure released and the mold was cooled. After a total time of 1 hour, 40 minutes, the mold was removed from the press and quenched in cold water. The molded disk so obtained was hard and shiny brown. It had a density of 1.54, and a Barcol hardness (No. 935–1) of 75. Flexural properties were determined to be: strength — 4,520 p.s.i.; and modulus — 860,000 p.s.i.

EXAMPLE 10

A polymerization vessel with a nitrogen atmosphere was charged with 3.0 parts of 4,4'-diethynylbiphenyl, 0.15 part of bis(triphenylphosphine) nickel dicarbonyl and 100 parts of anhydrous dioxane. The solution was heated under nitrogen on a steam bath and refluxed for 1 hour. About 65% of the monomer had been converted in this time to a prepolymer having a number average molecular weight of 3000. To the solution was added 0.4 part of diphenylmethane. The solution was then evaporated to dryness and dried under a high vacuum.

A film was prepared from the yellow solid so obtained, which was a mixture of 57% prepolymer, about 31% of unreacted monomer and 12% diphenylmethane, by heating this solid on a steel plate at 160°C. This film was then cured under nitrogen at atmospheric pressure at 250°C. for 4 hours. This film had a weight loss of only 10% on heating in air to 500°C. at a rate of 10° per minute.

EXAMPLE 11

The polymerization of Example 10 was repeated except that di(4-ethynylphenyl) ether was substituted for the 4,4'-diethynylbiphenyl used in that example and the prepolymerization reaction time was 2 hours. After removal of the dioxane solvent, there was obtained a very viscous, gummy, yellow solid, which was a mixture of 60% prepolymer, with a number average molecular weight of about 2500, and 40% unreacted monomer. Into this gummy solid was mixed diphenyl ether in the amount of 10% by weight based on the weight of the gummy solid. The resulting material then was formed into a film, as in Example 10, at 150°C. and cured at 250°C. for 4 hours. The cured film had a weight loss in air of 10% when heated to 500°C. at a rate of 10° per minute.

EXAMPLES 12 and 13

A prepolymer was prepared, following the general procedure described in Example 9, using as the monomer a mixture of 90% meta- and 10% para-diethynylbenzene, 0.26% nickel catalyst and polymerizing to a conversion of 80%. The prepolymer had a number average molecular weight of 5500, contained 12.8% acetylene groups and had an aromatic proton to olefinic proton ratio of 13:1.

Molding compositions were prepared from this prepolymer by blending it with 25% by weight of diphenylmethane and additionally adding 1.1 parts per hundred parts of the blend, of butyl acid phosphate as a stabilizer to one of them.

Disks 30 to 35 mils thick and one inch in diameter were prepared and cured by heating for 5 hours at 250°C. These disks were then heated in a forced air oven at 260°C. The time, in hours, at this temperature to give a 10% weight loss of the resin is tabulated below.

| Stabilizer Added | Time to 10% wt. loss at 260°C. |
|---|---|
| None | 221 |
| Butyl acid phosphate | 550 |

EXAMPLE 14

Into an argon flushed reaction vessel was placed 20 parts of 1-chloro-2,5-diethynylbenzene and 70 parts of benzene. The vessel contents were stirred and heated to reflux. A solution of 0.05 part of nickel acetylacetonate in 4.5 parts of benzene at 40°C. was added followed by a solution of 0.15 part of triphenylphosphine in 4.5 parts of benzene. The solution was allowed to reflux for 1.5 hours, at which point about 80% of the monomer had been converted to prepolymer. The solution was cooled and poured into 5 volumes of methanol. The brown solid that precipitated was filtered, washed and vacuum dried. The yield of polymer was 9.0 parts. The prepolymer had a number average molecular weight of 7000, contained 11% acetylene groups and the aromatic to olefinic proton ratio was 6:1. This prepolymer material was mixed with 1.8 parts of phenanthrene and molded at 150°C. and cured at atmospheric pressure at 250°C. for 2 hours. The resulting resin had a flexural strength of 5500 p.s.i. and a flexural modulus of 750,000 p.s.i.

EXAMPLE 15

A prepolymer was prepared as described in Example 9, the prepolymerization reaction being carried to a monomer cnversion of 90%. This prepolymer had a number average molecular weight of 9700, contained 9.5% acetylene groups and had an aromatic to olefinic proton ratio of 8:1. It was blended with 17%, by weight, of anthracene in benzene and the benzene was then removed by evaporation. The blend was molded in a picture frame mold at 140° to 150°C. for 6 minutes under 6000 p.s.i. pressure and then cured at atmospheric pressure by heating for 2 hours at 250°C. The resin had a flexural strength of 6700 p.s.i. and a flexural modulus of 950,000 p.s.i. Repeated flexural modulus measurements were carried out on this molding at increasing temperature. The following data were obtained:

| Temp., °C. | Flexural Modulus (p.s.i.) |
|---|---|
| 42 | 920,000 |
| 103 | 930,000 |
| 145 | 810,000 |
| 183 | 840,000 |
| 231 | 780,000 |
| 300 | 760,000 |
| 326 | 720,000 |

EXAMPLE 16

A copolymer prepolymer of diethynylbenzene and phenylacetylene was prepared in refluxing benzene solvent. The polymerization vessel was charged with 60 parts of a 90:10 mixture of m- and p-diethynylbenzenes, 60 parts of phenylacetylene, 600 parts of benzene and 2 parts of chlorobenzene. After heating to reflux, 5 parts of a catalyst solution prepared by adding 0.3 part of nickel acetylacetonate and 0.6 part of triphenylphosphine in 15 parts benzene were added. After 2 hours, an additional 10 parts of this catalyst solution was added. After 5 hours, gasliquid chromatographic analysis showed that 74% of the diethynylbenzenes and 35% of the phenylacetylene had been converted to copolymer. The copolymer was precipitated by adding the solution to five times its volume of petroleum ether, 26 parts being recovered. This product had a number average molecular weight of about 3,000, an acetylene content of 8.9%, and an aromatic to olefin proton ratio of 5.5:1.

A molding composition was prepared from this prepolymer by adding 12% by weight of 1,3-diphenylbenzene and disks were molded using a mold temperature of 150°C. for 6 minutes with 2000 p.s.i. pressure, followed by curing 2 hours at 250°C. at atmospheric pressure. The flexural properties were found to be: strength — 8000 p.s.i.; modulus — 975,000 p.s.i.

EXAMPLE 17

A copolymer prepolymer of diphenylbutadiyne and p-diethynylbenzene was prepared in refluxing benzene solvent. The polymerization vessel was charged with 63 parts of diphenylbutadiyne, 2 parts of diethynylbenzene, 600 parts of benzene, and 2 parts of chlorobenzene. After heating to reflux, 2 parts of a catalyst mixture prepared by mixing 2 parts of nickel acetylacetonate and 4 parts of triphenylphosphine in 20 parts of benzene were added. After 1 hour, an additional 10 parts of diethynylbenzene was added. After 2 hours, 10 parts of diethynylbenzene and 2 parts of catalyst solution were added. After 3 hours, 20 parts of diethynylbenzene and 4 parts of catalyst solution were added.

After a total reaction period of 7 hours, gas-liquid chromatographic analysis of the reaction mixture showed that 10% of each of the monomeric components remained. The solution was added to 5 times its volume of methanol, and 77 parts of the copolymer was precipitated. It had an acetylene content of 8.4% and an aromatic to olefin hydrogen ratio of 8:1.

A molding composition was prepared from this prepolymer by adding 12% by weight of phenanthridine and 1.0% by weight of butyl acid phosphate. Disks were molded using a mold temperature of 150°C. for 6 minutes at 2000 p.s.i., followed by curing outside the mold 2 hours at 250°C. at atmospheric pressure. The flexural properties of these cured disks were found to be: strength — 5200; modulus — 750,000 p.s.i.

EXAMPLE 18

A polymerization vessel with an argon atmosphere was charged with 60 parts of phenylacetylene, 54 parts of metadiethynylbenzene, 6 parts of para-diethynylbenzene, 422 parts of benzene and 0.3 parts of monochlorobenzene. The solution was brought to reflux, with stirring, then 0.8 part of triphenylphosphine and 0.4 part of nickel acetylacetonate in benzene were added to the refluxing solution. The reaction was monitored by gas-liquid chromatographic analysis. Three hours after addition of the catlyst, 88.3% of the diethynylbenzene and 49.5% of the phenylacetylene had been utilized. The solution was cooled and poured into seven volumes of petroleum ether. The precipitated powder was filtered, washed with fresh petroleum ether and vacuum dried to obtain 53 parts (46% yield) of light yellow copolymer. Calculation based on monomer usage showed the copolymer to contain 64 mol percent of diethynylbenzene and 36 mol percent of phenylacetylene.

A molding composition was prepared from the above prepolymer using 25% of 2,2'-dipyridyl as fluidizer. Disks were molded from this composition by heating for 6 minutes at 150°C. under 1000 p.s.i. and cured by heating for 5 hours at 250°C. at atmospheric pressure. The resulting product had an average flexural strength of 11,300 p.s.i. and an average flexural modulus of 1,106,000 p.s.i. On testing the sample by thermogravimetric analysis at a heating rate of 10°C. per minute to 500°C., a weight loss of 8% resulted. A weight loss of 2.3% was observed on heating a sample at 260°C. for 220 hours in the oxidation test.

413 parts of dioxane, 0.3 part of monochlorobenzene, 0.7 parts of triphenylphosphine and 0.3 parts of nickel acetylacetonate. Diethynylbenzene usage was 100% and diphenylbutadiyne usage was 83.7%. The light yellow copolymer product was obtained in 47% yield and contained 27.8 mol percent diethynylbenzene and 72.2 mol percent diphenylbutadiyne. Following the procedure of Example 18, a molding composition was prepared using 2,2'-diquinolyl as the fluidizer. The viscosity of the composition at 100°C. was $7\times10^{-5}$ posie. The composition was molded and cured. The cured product had an average flexural strength of 7250 p.s.i. and an average flexural modulus of 425,000 p.s.i.

EXAMPLE 20

The procedure of Example 19 was essentially duplicated except to use 32.2 parts of diphenylbutadiyne, 61 parts of meta-diethynylbenzene and 6.8 parts of para-diethynylbenzene as the monomer mixture. The catalyst components were also reduced to 0.35 part of triphenylphosphine and 0.15 part of nickel acetylacetonate, and the reaction time was one hour from catalyst addition. The copolymer product contained 68.9 mol percent diethynylbenzene and 31.1 mol percent diphenylbutadiyne. Following the procedure of Example 18, a molding composition was prepared from the copolymer, and the composition was molded and cured. The cured product had an average flexural strength of 6250 p.s.i. and an average flexural modulus of 355,000 p.s.i.

EXAMPLE 21

The procedure of Example 19 was duplicated except to substitute triphenylphosphine for 2,2'-diquinolyl as the fluidizer. The cured product had an average flexural strength of 7325 p.s.i. and an average flexural modulus of 450,000 p.s.i.

EXAMPLE 22

A prepolymer was prepared according to the procedure of Example 1. Molding compositions were prepared from this prepolymer by blending it with 25% by weight of a number of fluidizers. Table V gives the viscosity of these compositions according to the procedure of Example 2. The physical and oxidation resistance properties of the cured products are also shown in the table.

TABLE V

| Fluidizer | Weight % (based on prepolymer) | Viscosity at 100°C. ($10^5$ poise) | Flexural Strength (p.s.i.) | Flexural Modulus (p.s.i.) | % Weight Loss in Air - (220 Hours at 260°C.) |
|---|---|---|---|---|---|
| None | 0 | 500 | | 8 | |
| Acenaphthene | 25 | 1.8 | 6000 | 800,000 | 1 |
| m-Terphenyl | 25 | 0.3 | 10,000 | 810,000 | 3 |
| Methylnaphthalene | 25 | 2 | 6,000 | 1,100,000 | 12 |
| Quinoline | 25 | 3 | 5,500 | 800,000 | 8 |
| Diphenyl ethane | 25 | 3.5 | 14,000 | 900,000 | 7 |

EXAMPLE 19

Following the procedure of Example 18, a copolymer was prepared from a reaction mixture containing 75 parts of diphenylbutadiyne, 22.5 parts of meta-diethynylbenzene, 2.5 parts of para-diethynylbenzene,

EXAMPLE 23

Using a prepolymer prepared from a 90:10 mixture of meta-diethynylbenzene and para-diethynylbenzene according to the procedure of Example 1, molding compositions were prepared and evaluated according to the procedures of Examples 2, 3, 4 and 5, using varying amounts of high boiling aromatic coal tar and petroleum pitches as fluidizers.

The petroleum pitches are mixtures of high boiling aromatic compounds produced during the high temperature cracking of petroleum. The coal tar pitches are mixtures of high boiling aromatic compounds derived from coal tar, the volatile components of the coal tar having been removed by distillation, and phenolic and acidic materials having been substantially removed by caustic extraction.

These pitches are low in acid, phenol, alcohol and non-aromatic unsaturation content as measured by acid, hydroxyl and bromine number determinations. They contain no crystalline organic phase on heating to a temperature above 100°C. Materials of this type are known to contain primarily condensed ring aromatic compounds such as naphthalene, methyl naphthalenes, thionaphthen, quinoline, anthracene, phenanthrene, methyl anthracenes, methyl phenanthrenes, pyrene, chyrsene, benzypyrenes, perylene, picene, benzperylenes and coronene, and compounds containing the aromatic rings coupled to each other, such as biphenyl, acenaphthene, carbozole, fluorene, diphenyl ether, fluoranthene, benzfluorenes and benzfluoranthenes.

The characteristics of the fluidizers used in these formulations and the evaluation results are given in Tables VI, VII and VIII.

TABLE VI

CHARACTERISTICS OF PETROLEUM AND COAL TAR PITCHES

| Designation | Bromine Number | Hydroxyl Number | Acid Number | Number Average Molecular Weight | Brookfield Viscosity (Centipoise) | % of Aromatic Hydrogens | % Volatile at 240°C. (ASTM D20-56) |
|---|---|---|---|---|---|---|---|
| Petroleum Pitch No. 1 | 25 | 17 | 11 | | | | |
| Petroleum Pitch No. 2 | 30 | 2.5 | 3.4 | | 17 at 100°C. | | |
| Coal Tar Pitch No. 1 | 40 | 0.6 | 2.4 | 290 | 72 at 100°C. | 83 | 1.1 |
| Coal Tar Pitch No. 2 | 46 | 24 | 2.0 | | 265 at 100°C. | | |
| | | | | | 9 at 220°C. | | |
| Coal Tar Pitch No. 3 | 62 | 21 | 2.3 | 369 | 24 at 100°C. | 77 | 0.1 |

TABLE VII

| Fluidizer | Weight % | 80°C. | Viscosity ($\times 10^5$ poise) 90°C. | 100°C. | 110°C. |
|---|---|---|---|---|---|
| | (based on prepolymer) | | | | |
| None | 0 | >1000 | 1000 | 250 | 13 |
| Petroleum Pitch No. 1 | 25 | 21 | 11 | 6.5 | 6 |
| | 100 | 0.3 | 0.08 | 0.07 | 0.08 |
| Petroleum Pitch No. 2 | 12 | — | 140 | 29 | 8 |
| | 25 | 26 | 11 | 7 | 4 |
| | 100 | 0.8 | 0.2 | 0.06 | 0.09 |
| | 200 | 0.003 | 0.005 | — | — |
| Coal Tar Pitch No. 1 | 25 | 28 | 6.5 | 3 | 2 |
| | 100 | 4.5 | 2 | 1 | 0.3 |
| Coal Tar Pitch No. 2 | 25 | — | 230 | 69 | 15 |
| | 100 | 9 | 4 | 5 | 3 |
| Coal Tar Pitch No. 3 | 25 | 50 | 21 | 9.5 | 6 |
| | 100 | 0.8 | 1 | 0.2 | 0.03 |

TABLE VIII

| Fluidizer | Weight % | Flexural Strength | Flexural Modulus | Weight Loss in Air - (220 hrs. at 260°C.) | Weight Loss - (Heating to 500°C. in Nitrogen) | % Modulus Retention at 350°C. |
|---|---|---|---|---|---|---|
| | (based on prepolymer) | (p.s.i.) | (p.s.i.) | % | % | |
| None | 0 | 9,000 | 1,050,000 | 7 | 7 | |
| Petroleum Pitch No. 1 | 25 | 14,000 | 930,000 | 1.5 | 5 | 55 |
| Petroleum Pitch No. 2 | 12 | 7,600 | 970,000 | 0.7 | 4 | |
| | 25 | 7,600 | 920,000 | 0.4 | 6 | 60 |
| | 100 | — | — | — | 33 | 43* |
| Coal Tar Pitch No. 1 | 25 | 12,300 | 1,090,000 | 0.9 | 6 | 55 |
| | 100 | 13,800 | 2,430,000 | 0.2 | 11 | |
| Coal Tar Pitch No. 2 | 25 | 5,670 | 1,090,000 | 0.8 | 4 | |
| | 100 | 4,500 | 670,000 | 0.2 | 14 | 35 * |
| Coal Tar Pitch No. 3 | 25 | 8,330 | 1,450,000 | 0.6 | 3 | 60 |
| | 100 | 19,900 | 870,000 | 3.2 | 31 | 20 * |

*Values obtained on compositions containing calcined diatomaceous earth filler equal in weight to prepolymer plus fluidizer.

What I claim and desire to protect by Letters Patent is:

1. A thermosetting composition comprising a blend of (1) a prepolymer of at least one polyacetylenically substituted aromatic compound, said prepolymer having a number average molecular weight from about 900 to about 12,000, a ratio of aromatic protons to olefinic protons greater than about 2.4 and containing from about 5 to about 20% acetylenic groups by weight of the prepolymer, with (2) from about 2 to about 200%, by weight of the prepolymer, of at least one aromatic organic compound containing at least two six-membered aromatic rings, said rings being condensed with each other or coupled with each other directly or through a methylene, dimethylmethylene, ethylene or vinylene group, said compound or mixtures thereof containing no crystalline organic phase at 220°C., having a viscosity of less than 20 centipoises at 220°C. and containing no more than 5% of material volatile at 240°C.

2. The thermosetting composition of claim 1 wherein the prepolymer comprises a polymer of a diethynylbenzene.

3. the thermosetting composition of claim 2 wherein the polymer of a diethynylbenzene is a copolymer of a diethynylbenzene and diphenylbutadiyne.

4. The thermosetting composition of claim 2 wherein the polymer of a diethynylbenzene is a copolymer of a diethynylbenzene and phenylacetylene.

5. The thermosetting composition of claim 2 wherein the aromatic organic compound is anthracene.

6. The thermosetting composition of claim 5 wherein diphenylbutadiyne is used in conjunction with the anthracene.

7. The thermosetting composition of claim 2 wherein the aromatic organic compound is phenanthrene.

8. The thermosetting composition of claim 7 wherein diphenylbutadiyne is used in conjunction with the phenanthrene.

9. The thermosetting composition of claim 2 wherein the aromatic organic compound is diphenylmethane.

10. The thermosetting composition of claim 2 wherein the aromatic organic compound is the complex mixture of high boiling aromatic compounds present in high boiling fractions of coal tar pitch.

11. The thermosetting composition of claim 2 wherein the aromatic organic compound is the complex mixture of high boiling aromatic compounds present in high boiling fractions of petroleum pitch.

12. A thermoset resin obtained by heat curing the thermosetting composition of claim 1.

13. The process of preparing a thermoset resin essentially free of aliphatic unsaturation which comprises (1) in a first stage (a) preparing a prepolymer by polymerizing at least one polyacetylenically substituted aromatic compound by heating said compound with said aromatization catalyst in an inert orgnaic diluent to a temperature of from bout 55°C. to about 250°C. until from about 30% to about 90% of said compound has been converted to polymer, (b) separating the prepolymer from the polymerization reaction mixture, and (2) in a second stage, (a) fabricating a blend of said prepolymer and from about 2 to about 200%, by weight of the prepolymer, of at least one aromatic organic compound containing at least two six-membered aromatic rings, said rings being condensed with each other or coupled with each other directly or through a methylene, dimethylmethylene, ethylene or vinylene group, said compound or mixtures thereof containing no crystalline organic phase at 220°C., having a viscosity of less than 20 centiposies at 220°C. and containing no more than 5% of material volatile at 240°C., and (b) heating the fabricated blend to a temperature of from about 100°C. to about 300°C.

14. The process of claim 13 wherein the prepolymer prepared in the first stage is prepared from a diethynylbenzene and the aromatic organic compound used in the second stage is the complex mixture of high boiling aromatic compounds present in high boiling fractions of coal tar pitch.

15. The process of claim 13 wherein the prepolymer prepared in the first stage is prepared from a diethynylbenzene and the aromatic organic compound used in the second stage is the complex mixture of high boiling aromatic compounds present in high boiling fractions of petroleum pitch.

* * * * *